March 29, 1927.                                            1,622,619
                        W. C. WARREN
                       CULTIVATOR TOOTH
                     Filed Sept. 4, 1926
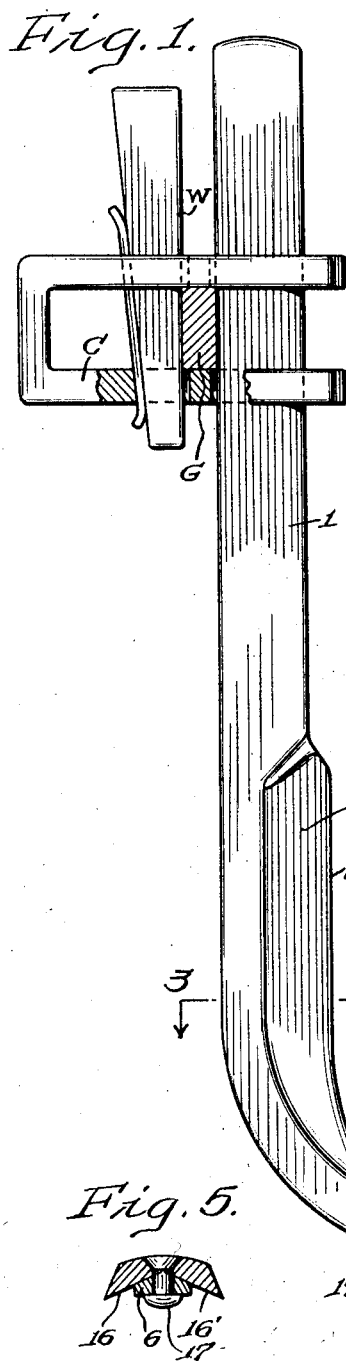
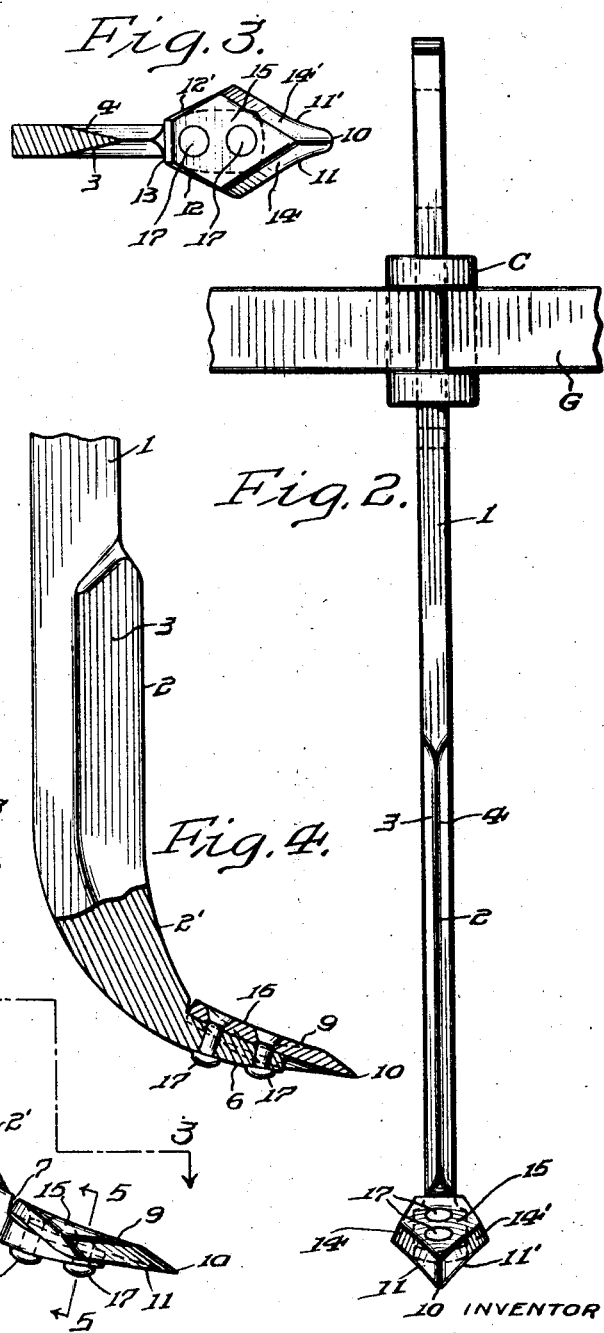
INVENTOR
William C. Warren,
BY
ATTORNEYS
WITNESS Patented Mar. 29, 1927.

1,622,619

UNITED STATES PATENT OFFICE.

WILLIAM C. WARREN, OF PHILADELPHIA, PENNSYLVANIA, ASSIGNOR TO S. L. ALLEN & CO., INC., A CORPORATION OF PENNSYLVANIA.

CULTIVATOR TOOTH.

Application filed September 4, 1926. Serial No. 133,562.

My invention relates more particularly to cultivator teeth intended for the cultivation or working of the soil at a considerable depth as distinguished from those forms of teeth primarily designed for cultivating the soil for but a short distance below its surface.

An object of my invention, therefore, is the provision of a cultivator tooth adapted for said purpose which is of improved construction and so formed that when moved through the soil by means of the cultivator to which it is attached, the tooth will readily cleave through that portion of the soil adjacent the surface thereof while simultaneously working, agitating and stirring up the subjacent soil at a considerable depth therebelow.

A further object of the invention is to provide a cultivator tooth of the character aforesaid the parts of which are preferably formed of different degrees of hardness so that that part of the tooth which is subjected to the greatest wear under operative conditions will be more wear resistant in character than the other parts of the tooth with consequent prolongation of the effective life of the latter.

A still further object is the provision of a cultivator tooth adapted for deep cultivation in which that part of the tooth which is subjected to the greatest wear may be readily replaced by the user either when damaged or when through prolonged use said part has become so worn as to render it ineffective for its intended purpose, and in which the cutting edge of the body or shank of the tooth may be readily sharpened by the user when desired so as to keep the tooth in satisfactory operative condition.

Additional objects of the invention are to provide a cultivator tooth of rugged construction and of such character that it will not be readily damaged, broken or bent out of shape under the rough usage to which articles of this kind are necessarily subjected, as well as to provide a tooth having other improvements and novel features of design and construction as will hereinafter more fully appear.

To enable those skilled in the art to readily comprehend and practice the invention I have illustrated in the accompanying drawing and will now proceed to describe a cultivator tooth constructed in accordance with a preferred embodiment thereof, Fig. 1 of the said drawing being a side elevation of the tooth as it appears when in operative position in a cultivator, certain parts of which are shown in the said figure, and Fig. 2 being a front elevation thereof. Fig. 3 is a fragmentary top plan view of the lower end of the tooth partially in horizontal section on line 3—3 in Fig. 1; Fig. 4 is a fragmentary view of the lower end of the tooth partially in side elevation and partially in central vertical section; and Fig. 5 is a transverse section through the point of the tooth on line 5—5 in Fig. 1 looking in the direction of the arrows. The same symbols are used to designate the same parts in the several views.

It will be understood that under operative conditions the tooth is attached to a cultivator of suitable form in any convenient way, a plurality of the teeth being generally employed and arranged at spaced intervals on the gang bar or other portion of the cultivator intended for their reception in such manner that when the cultivator is moved over the ground the teeth will be drawn therethrough at spaced intervals and thereby perform their intended function, namely, that of cultivating the soil. Therefore, for convenience of description I shall herein refer to the different parts of the tooth in accordance with the relation which they bear to each other when the tooth is supported in operative position as shown in Fig. 1 and considering the front of the tooth as that edge or face thereof which forms the leading edge or face as the tooth is operatively moved through the soil.

The particular embodiment of the invention which I have chosen to illustrate comprises a shank 1 the upper part of which is of rectangular cross section and adapted to extend through a mounting clip C which surrounds the gang bar G of the cultivator and is firmly clamped thereto by a wedge W or in any other suitable way in such manner as to hold the shank of the tooth rigidly to the bar in upright or vertically extending position. The means employed for holding the shank of the tooth to the bar or other portion of the cultivator on which it is supported form no part of the present invention and may of course be of any suitable form, although a clip of the general character of that shown is ordinarily employed for the purpose thereby enabling the relative height of the tooth shank with respect to the bar to be readily adjusted so as to cause the tooth to enter the soil to the exact depth desired.

Preferably the shank of the tooth is formed of steel of a quality suitable for forging and the lower portion of the front edge of the shank so formed during the forging of the tool as to present a sharp cutting edge 2 lying somewhat forward of the front face of the upper part of the shank, the side faces 3 and 4 adjacent the cutting edge 2 being rearwardly and outwardly inclined as best shown in Fig. 3. The extreme lower end of the shank is curved forwardly and terminates in a toe 6 which is preferably flattened out laterally so that the width of the toe is considerably greater than the normal width of the shank. Ordinarily the operation of flattening out or widening the toe will result in decreasing its vertical thickness whereby an offset 7 will be formed at the point of the junction of the toe and the shank proper but in any case I prefer to form this offset in any suitable way and to make the toe materially less in vertical thickness than the shank at the point of juncture of the toe therewith and at which the lower end of the cutting edge 2 is terminated. Preferably and as shown in the drawing the lower part of the cutting edge is also curved forwardly as at 2′ but not quite as sharply as the adjacent rear face of the shank so that the latter and the said curved portion of the cutting edge tend to converge and are most nearly adjacent in the vicinity of the offset.

The toe 6 is operative to support a point 9 which is preferably formed of hardened steel and of substantially the shape illustrated, i. e., having a sharp forward extremity 10 lying substantially in the plane of the cutting edge 2 and from which the lower side edges 11, 11′ diverge rearwardly for a suitable distance and then respectively inwardly converge as at 12, 12′ to meet a transversely extending lower edge 13 which when the point is operatively positioned on the shank abuts or substantially abuts the face of the offset 7. From the lower front edges 11, 11′ the sides of the point are respectively inwardly and upwardly beveled as at 14, 14′ while from the edges 12, 12′ the sides are carried up more nearly straight. Additionally the upper surface 15 of the point may be curved slightly downwardly and outwardly from its centre in opposite directions as best shown in Figs. 1 and 5, while the point measured transversely between the rear ends of the side edges 11, 11′ is of considerably greater width then the shank.

The under face of the point is preferably arranged to generally conform to the upper surface of the toe 6 and this surface I prefer to arrange with a slight outward and downward slope on each side of its longitudinal centre line as best shown in Fig. 5; thus preferably and in conformity therewith, the under surface of the point will present outwardly and downwardly inclined surfaces 16, 16′ respectively extending from the centre line of the point to the side edges thereof, so that when the point is disposed on the toe, its under surface will conform to and have a firm bearing on the upper surface of the latter, as best shown in Fig. 5.

For securing the point in operative position on the toe I preferably employ a pair of rivets 17 extending through longitudinally spaced holes drilled through the point and the toe in proper registry with each other and of suitable size to receive the rivets. Peferably the holes in the point are countersunk as shown in Fig. 4 so as to receive the rivet heads and allow the upper ends thereof to lie flush with the upper surface of the point, the lower ends of the rivets being headed over against the under face of the toe so as to hold the point securely in position thereon.

It will be apparent from an inspection of the drawing that with the parts constructed and assembled substantially as described, the cutting edge 2 curving forwardly at 2′ in an easy sweep substantially merges into the upper surface of the hardened, substantially spear-shaped point while the lower part of the rear edge of the tooth shank also sweeps forwardly in an easy but somewhat sharper curve and when the implement is viewed from side, substantially merges into or terminates in line with the lower side edges of the point, the latter when the tool is in vertical position being slightly forwardly and downwardly disposed. Thus, when the tooth is moved forward through the soil by the cultivating machine to which it is operatively attached as heretofore described, the cutting edge 2 is operative to cleave the soil for a predetermined distance below its surface while the point of the tooth stirs up and agitates the soil both in the plane of its movement and also, due to its slightly downwardly and forwardly inclined position, for a considerable distance thereabove the combined action of the cutting edge and point thus effecting a thorough and adequate cultivation of the soil to a depth determined by the relative vertical adjustment of the tooth in the cultivator.

It has been found in practice that the greatest wear always occurs on the point of a cultivator tooth so that when the shank and point are formed as an integral unit of ordinary soft steel or other like material the point of the tooth wears away so rapidly as to very shortly render the whole tooth useless. To construct the whole tooth including the shank of tool steel or other material capable of being hardened with a view to obviating the rapid wear of the point is impractical since to do so would so increase the cost of the tooth as to prevent its commercial employment. However, by providing the shank of the tooth with a point supporting toe of such character as to afford a firm seat for the point and then forming the latter of suitable wear resisting material such as hardened steel, I am enabled to greatly prolong the life of the tool without materially enhancing its cost; additionally when such a construction is employed the user can very readily substitute a new point at a trifling expense if after long use or through contact with stones or other obstructions in the soil, the original point becomes worn out or damaged. This ability to renew the tooth point by merely knocking out the rivets, substituting a new point in place of the old and re-riveting it in position marks a distinct improvement in the art since it makes possible the deep cultivation of certain classes of soils, more particularly those containing large numbers of stones and other hidden obstructions, which it has hitherto been extremely difficult and expensive if not practically impossible to cultivate in this manner owing to the excessive wear and damage to the cultivating teeth and expense and loss of time required for their re-sharpening or replacement.

It will moreover be understood that the user can readily re-sharpen the cutting edge 2 by grinding or filing the faces 3, 4 and that as in the initial formation of the tooth this edge is disposed at a relatively considerable distance in front of the front face of the tooth shank, the re-sharpening operation may be repeated a large number of times before the edge 2 is ground away to the plane of the said face or even to a point slightly in rear thereof.

It will thus be apparent that I have provided a novel form of tooth adapted for deep cultivation which is of extremely long life even when operated under the most adverse conditions and which may be readily maintained in a maximum state of efficiency by the user at a relatively small expense over a long period of time, while capable of initial manufacture and sale at a cost but very slightly in excess of the forms hitherto proposed for similar purposes but which for the reasons above mentioned are unsatisfactory for the performance of the function for which they were designed.

Moreover, while I have herein illustrated and described a preferred form of my invention with considerable particularity, I do not thereby desire or intend to specifically limit myself thereto as the same may be modified in minor particulars of design and construction without departing from the spirit and scope of the invention as defined in the appended claims.

Having thus described my invention, I claim and desire to protect by Letters Patent in the United States:

1. A cultivator tooth comprising a shank of rectangular cross section adapted to be supported under operative conditions in a substantially vertical position, the lower portion of the shank being formed to provide a sharp generally vertically extending cutting edge lying in advance of the adjacent face of the upper portion of the shank and being forwardly curved and transversely flattened at its extremity to provide a point-supporting toe having its upper face downwardly offset from the adjacent end of said cutting edge and lying in advance thereof, a generally spear-shaped point disposed on the upper face of the toe, and means for securing said point to said toe.

2. A cultivator tooth intended for deep cultivation comprising a shank of mild steel adapted to be supported under operative conditions in a substantially vertical position, the lower portion of the shank being formed to provide a sharp, generally vertically extending cutting edge lying in advance of the forward face of the upper portion of the shank and being forwardly curved and transversely flattened at its extremity to provide a point-supporting toe lying in advance of said cutting edge and directed downwardly and forwardly with respect thereto, the upper face of the toe being downwardly offset from the adjacent end of the said cutting edge, a generally spear-shaped point of hardened steel disposed on the upper face of the toe and means for securing said point to said toe, the apex of said point lying in the plane of said cutting edge and the side edges of the point diverging rearwardly and outwardly from said apex and the point at the rear end of said edges being of greater width than the shank.

In witness whereof, I have hereunto set my hand this 2nd day of September, A. D. 1926.

WILLIAM C. WARREN.